United States Patent
Yin

(10) Patent No.: US 10,740,594 B2
(45) Date of Patent: Aug. 11, 2020

(54) FACE RECOGNITION METHOD AND DEVICE, AND PICTURE DISPLAYING METHOD AND DEVICE

(71) Applicant: ZTE CORPORATION, Shenzhen, Guangdong Province (CN)

(72) Inventor: Jianpeng Yin, Shenzhen (CN)

(73) Assignee: ZTE CORPORATION (CN)

( * ) Notice: Subject to any disclaimer, the term of this patent is extended or adjusted under 35 U.S.C. 154(b) by 115 days.

(21) Appl. No.: 16/093,138

(22) PCT Filed: Sep. 14, 2016

(86) PCT No.: PCT/CN2016/099056
§ 371 (c)(1),
(2) Date: Oct. 11, 2018

(87) PCT Pub. No.: WO2017/177616
PCT Pub. Date: Oct. 19, 2017

(65) Prior Publication Data
US 2019/0156107 A1 May 23, 2019

(30) Foreign Application Priority Data

Apr. 15, 2016 (CN) .......................... 2016 1 0234499

(51) Int. Cl.
*G06K 9/00* (2006.01)
*G06K 9/60* (2006.01)
(Continued)

(52) U.S. Cl.
CPC ........... *G06K 9/00288* (2013.01); *G06K 9/00* (2013.01); *G06K 9/00228* (2013.01);
(Continued)

(58) Field of Classification Search
CPC ........ G06K 9/00288; G06K 9/00; G06K 9/60; G06K 9/00275; G06K 9/4661;
(Continued)

(56) References Cited

U.S. PATENT DOCUMENTS

| 2007/0098229 A1 | 5/2007 | Wu et al. |
| 2011/0206246 A1* | 8/2011 | Wolf ................. G06K 9/00228 382/118 |

(Continued)

FOREIGN PATENT DOCUMENTS

| CN | 101430759 A | 5/2009 |
| CN | 102880438 A | 1/2013 |
| CN | 102917232 A | 2/2013 |

*Primary Examiner* — Jerome Grant, II
(74) *Attorney, Agent, or Firm* — McDonald Hopkins LLC

(57) ABSTRACT

Disclosed are a face recognition method and device, and a picture display method and device. The face recognition method includes: performing illumination estimation processing on an original face image to obtain a first face image (step 101); performing wavelet transform processing on the original face image to obtain a face image component (step 102); performing inverse wavelet transform processing on the face image component to obtain a second face image (step 103); performing histogram clipping processing on the second face image to obtain a third face image (step 104); and recognizing a face according to the first face image and the third face image (step 105). Through the above face recognition method and device, and the picture display method and device, the face can be recognized by the mobile phone and the user does not need to input an instruction via a touch screen or a key to adjust a displayed content. Therefore, the operation amount of the user is reduced, the intelligent degree of the mobile phone is improved, the convenience and the practicability for the user to use the mobile phone are enhanced and the user experience is improved.

13 Claims, 6 Drawing Sheets

(51) Int. Cl.
  *G06K 9/46* (2006.01)
  *G06K 9/52* (2006.01)
  *G06K 9/62* (2006.01)

(52) U.S. Cl.
  CPC ....... *G06K 9/00275* (2013.01); *G06K 9/4647* (2013.01); *G06K 9/4661* (2013.01); *G06K 9/527* (2013.01); *G06K 9/60* (2013.01); *G06K 9/6212* (2013.01)

(58) Field of Classification Search
  CPC .. G06K 9/4647; G06K 9/527; G06K 9/00228; G06K 9/6212; G06F 3/011; G06F 3/147
  USPC .......................................................... 382/118
  See application file for complete search history.

(56) References Cited

U.S. PATENT DOCUMENTS

2018/0144483 A1* 5/2018 Kang ................... G06K 9/4642
2018/0189550 A1* 7/2018 McCombe ......... G06K 9/00288

* cited by examiner

FACE RECOGNITION METHOD AND DEVICE, AND PICTURE DISPLAYING METHOD AND DEVICE

CROSS-REFERENCE

The present application is a U.S. National Phase Entry of International PCT Application No. PCT/CN2016/099056 having an international filing date of Sep. 14, 2016, which claims priority to Chinese Patent Application No. 201610234499.1 filed on Apr. 15, 2016. The present application claims priority and the benefit of the above-identified applications and the above-identified applications are incorporated by reference herein in their entirety.

TECHNICAL FIELD

The present document relates, but is not limited, to the field of network communications, and particularly, to a face recognition method and device, and a picture display method and device.

BACKGROUND

An information era provides convenience for us to know the ever-changing world at any time at any position. In the fast-paced work and life, people tend to have a variety of relaxation ways, for example, reading various kinds of information, such as favorite comics and interested military news and the like, via a mobile phone.

When a user browses a content displayed on a mobile phone screen, a distance between eyes of the user and the mobile phone screen is not fixed due to different actual usage scenarios. If the eyes of the user is relatively far from the mobile phone and the size of the content displayed on the mobile phone is relatively small, the user will not clearly see the content displayed on the mobile phone. Many mobile phones at present can only receive an instruction input by the user via a touch screen or a key and cannot actively acquire to know a current usage condition (for example, information such as a posture of the user and the distance between the eyes of the user and the mobile phone) of the user. Therefore, when the user finds that he/she cannot clearly browse the content displayed on the mobile phone, the mobile phone cannot know such condition, so the user has to input an instruction via the touch screen or the key to adjust the displayed content.

Concerning the problem that the mobile phone at present cannot effectively know the current usage condition when the user is using the mobile phone, any effective solution has not been proposed yet.

SUMMARY

The following is a summary to a subject matter described in detail in the present document, and the summary is not intended to limit the scope of protection of the claims.

Embodiments of the present disclosure provide a face recognition method and device, and a picture display method and device, which will solve the problem that in the known art the mobile phone cannot effectively know the current usage condition when the user is using the mobile phone.

An embodiment of the present disclosure provides a face recognition method, which includes:

performing illumination estimation processing on an original face image to obtain a first face image;

performing wavelet transform processing on the original face image to obtain a face image component;

performing inverse wavelet transform processing on the face image component to obtain a second face image;

performing histogram clipping processing on the second face image to obtain a third face image; and recognizing a face according to the first face image and the third face image.

In an exemplary embodiment, the step of performing wavelet transform processing on the original face image to obtain a face image component includes:

performing two-order wavelet transform processing on the original face image to obtain an illumination component, a face detail horizontal component, a face detail vertical component and a face detail diagonal component.

In an exemplary embodiment, the step of performing inverse wavelet transform processing on the face image component to obtain a second face image includes:

performing equalization processing on the illumination component;

performing linear addition processing on the face detail horizontal component;

performing linear addition processing on the face detail vertical component;

performing linear addition processing on the face detail diagonal component; and performing the inverse wavelet transform processing on the illumination component after the equalization processing, the face detail horizontal component after the linear addition processing, the face detail vertical component after the linear addition processing and the face detail diagonal component after the linear addition processing, to obtain the second face image.

In an exemplary embodiment, the step of recognizing a face according to the first face image and the third face image includes:

performing a logarithmic operation on a pixel value of the first face image to obtain a first pixel value;

performing a logarithmic operation on a pixel value of the third face image to obtain a second pixel value;

taking a ratio, obtained through the first pixel value divided by the second pixel value, as a face image; and recognizing the face according to the face image.

An embodiment of the present disclosure provides a face recognition device, which includes an illumination estimation processing module, a wavelet transform processing module, an inverse wavelet transform processing module, a histogram clipping processing module, and a face recognition module.

The illumination estimation processing module is configured to perform illumination estimation processing on an original face image to obtain a first face image.

The wavelet transform processing module is configured to perform wavelet transform processing on the original face image to obtain a face image component.

The inverse wavelet transform processing module is configured to perform inverse wavelet transform processing on the face image component to obtain a second face image.

The histogram clipping processing module is configured to perform histogram clipping processing on the second face image to obtain a third face image.

The face recognition module is configured to recognize a face according to the first face image and the third face image.

An embodiment of the present disclosure further provides a picture display method. The method includes:

making an adjustment on a displayed picture according to the recognized face that is recognized according to any above face recognition method, herein making an adjustment on a displayed picture according to the recognized face includes:

measuring a vertical distance between the recognized face and a terminal;

selecting a region on a display unit of the terminal; and adjusting a picture display size of the region according to a change of the vertical distance.

In an exemplary embodiment, the method further includes:

determining a parallel moving distance of the region according to an included angle between a frontal direction of the recognized face and a vertical direction of the terminal; and performing parallel movement on the region according to the parallel moving distance of the region.

In an exemplary embodiment, adjusting a picture display size of the region includes: adjusting the picture display size of the region by using the following formula:

$$L1=A1+B1*C1,$$

where the L1 is a size of a frame line, displayed on the terminal, for the face when a distance between the face and the terminal changes; the A1 is a maximum face frame line, displayed on the terminal, for the face; the B1 is a fixed value and characterizes an amplification factor of the frame line when the face is at N1 times far from a screen, and the value range of the B1 is (−1, 0) and the value range of the N1 is (0, 1); and the C1 characterizes a value about Dots Per Inch, dpi, of the terminal with a movement of the face, and the value range of the C1 is (1, 5).

In an exemplary embodiment, determining a parallel moving distance of the region includes:

determining the parallel moving distance of the region by using the following formula:

$$L2=A2+B2*C2,$$

where the L2 is a horizontal position, on the terminal, of the face; the A2 is a position, in the middle of the terminal, of the face, and at the moment an included angle between a direction of the face and the vertical direction of the terminal is 0°; the B2 is a fixed value and characterizes a quantity by which the face image on the terminal moves leftward or rightward when an actual face angle is rotated by N2°, the value range of the B2 is (−1, 1) and the value range of the N2 is [−90, 90]; and the C2 characterizes a value about Dots Per Inch, dpi, of the terminal with a movement of the face, and the value range of the C2 is (1, 3).

An embodiment of the present disclosure further provides a picture display device, which includes the face recognition device above described, a measurement module, a region selection module and an adjustment module.

The measurement module is configured to measure a vertical distance between the recognized face and a terminal.

The region selection module is configured to select a region on a display unit of the terminal.

The adjustment module is configured to adjust a picture display size of the region according to a change of the vertical distance.

In an exemplary embodiment, the device further includes a parallel moving module.

The parallel moving module is configured to determine a parallel moving distance of the region according to an included angle between a frontal direction of the recognized face and a vertical direction of the terminal, and perform parallel movement on the region according to the parallel moving distance of the region.

An embodiment of the present disclosure further provides a computer readable storage medium; the computer readable storage medium stores a computer executable instruction; and the computer executable instruction, when being executed, implements the face recognition method.

An embodiment of the present disclosure further provides a computer readable storage medium; the computer readable storage medium stores a computer executable instruction; and the computer executable instruction, when being executed, implements the picture display method.

The beneficial effects of the embodiments of the present disclosure are as follows.

By virtue of the terminal in the embodiments of the present disclosure, it is solved for the problem that in the known art the mobile phone cannot effectively know the current usage condition when the user is using the mobile phone, and any effective solution has not been proposed yet. In the embodiments of the present disclosure, the face can be recognized by the mobile phone and the user does not need to input an instruction via a touch screen or a key to adjust a displayed content. Therefore, the operation amount of the user is reduced, the intelligent degree of the mobile phone is improved, the convenience and the practicability for the user to use the mobile phone are enhanced and the user experience is improved.

The above description is only a summary to the technical solutions of the present application. To understand the technical means of the present application more clearly, the present application may be implemented according to contents in the specification. Furthermore, to make the above-mentioned and other objectives, features and advantages of the present application more apparent and simple, the specific implementation manners of the present application will be described below. After reading and comprehending the accompanying drawings and detailed description, other aspects may be understood.

BRIEF DESCRIPTION OF DRAWINGS

The accompanying drawings are only for the purpose of illustrating alternative implementation manners and are not to be construed as limitation to the present application. Throughout the drawings, same reference symbols represent same parts. In the drawings.

DETAILED DESCRIPTION

Exemplary embodiments of the present application will be described below in more detail with reference to the accompanying drawings. Although exemplary embodiments of the present application are shown in the accompanying drawings, it should be understood that the present application may, however, be implemented in different forms and should not be limited to the embodiments set forth herein. Rather, these embodiments are provided to thoroughly and completely understand the present application and fully convey the scope of the present application to those skilled in the art.

Embodiments of the present disclosure will be further described below in detail with reference to accompanying drawings and embodiments. It should be understood that the specific embodiments described here are merely for explaining the present application, and are not intended to limit the present application.

First Embodiment

Figure 1:
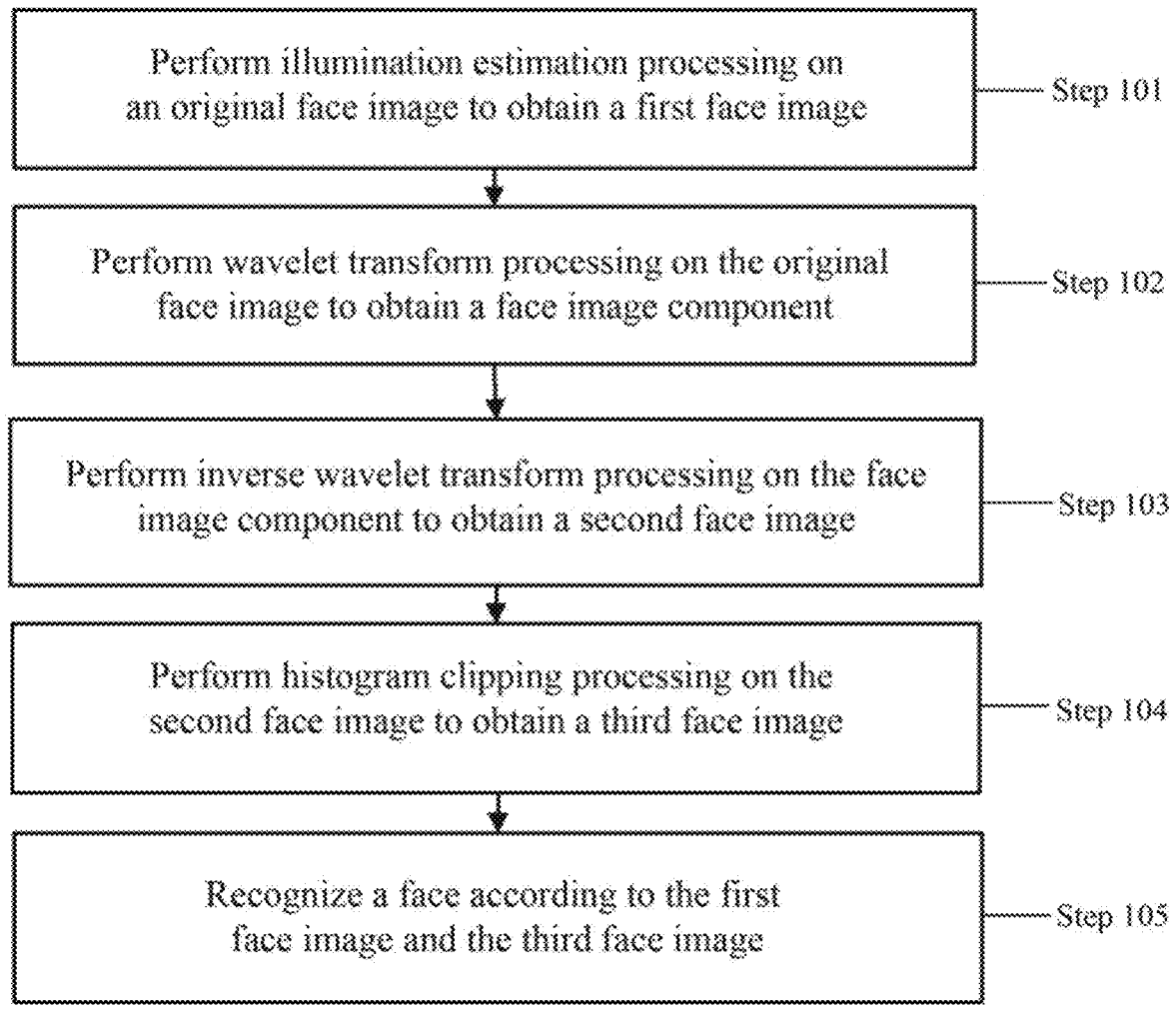
FIG. 1 is a flowchart of a face recognition method in a first embodiment of the present disclosure.

An embodiment of the present disclosure provides a face recognition method. FIG. 1 is a flowchart of the face recognition method in the embodiment of the present disclosure. As shown in FIG. 1, the face recognition method in the embodiment of the present disclosure includes the following steps 101-105.

In step 101, illumination estimation processing is performed on an original face image to obtain a first face image.

In step 102, wavelet transform processing is performed on the original face image to obtain a face image component.

In step 103, inverse wavelet transform processing is performed on the face image component to obtain a second face image.

In step 104, histogram clipping processing is performed on the second face image to obtain a third face image.

For example, 15% of pixels representing the high light in the front may be clipped, 15% of pixels representing the low light in the tail may be clipped and 16% to 84% of pixels in the middle may be kept, to obtain the third face image.

In step 105, a face is recognized according to the first face image and the third face image.

In an exemplary embodiment, in the step 102, the step that wavelet transform processing is performed on the original face image to obtain a face image component includes the following operations:

two-order wavelet transform processing is performed on the original face image to obtain an illumination component (LL), a face detail horizontal component (LH), a face detail vertical component (HL) and a face detail diagonal component (HH).

In an exemplary embodiment, in the step 103, the step that inverse wavelet transform processing is performed on the face image component to obtain a second face image includes:

performing equalization processing on the illumination component;

performing linear addition processing on the face detail horizontal component, for example, 1.5 times linear addition may be performed; the linear addition processing on the face detail horizontal component may be specifically performed according to actual condition and experience;

performing linear addition processing on the face detail vertical component, for example, 1.5 times linear addition may be performed; the linear addition processing on the face detail vertical component may be specifically performed according to the actual condition and experience;

performing linear addition processing on the face detail diagonal component, for example, 1.5 times linear addition may be performed; the linear addition processing on the face detail diagonal component may be specifically performed according to the actual condition and experience;

performing the inverse wavelet transform processing on the illumination component after the equalization processing, the face detail horizontal component after the linear addition processing, the face detail vertical component after the linear addition processing, and the face detail diagonal component after the linear addition processing, to obtain the second face image.

In an exemplary embodiment, in the step 105, the step that a face is recognized according to the first face image and the third face image includes:

performing a logarithmic operation on a pixel value of the first face image to obtain a first pixel value;

performing a logarithmic operation on a pixel value of the third face image to obtain a second pixel value;

taking a ratio, obtained through the first pixel value divided by the second pixel value, as a face image; and recognizing the face according to the face image.

Figure 2:
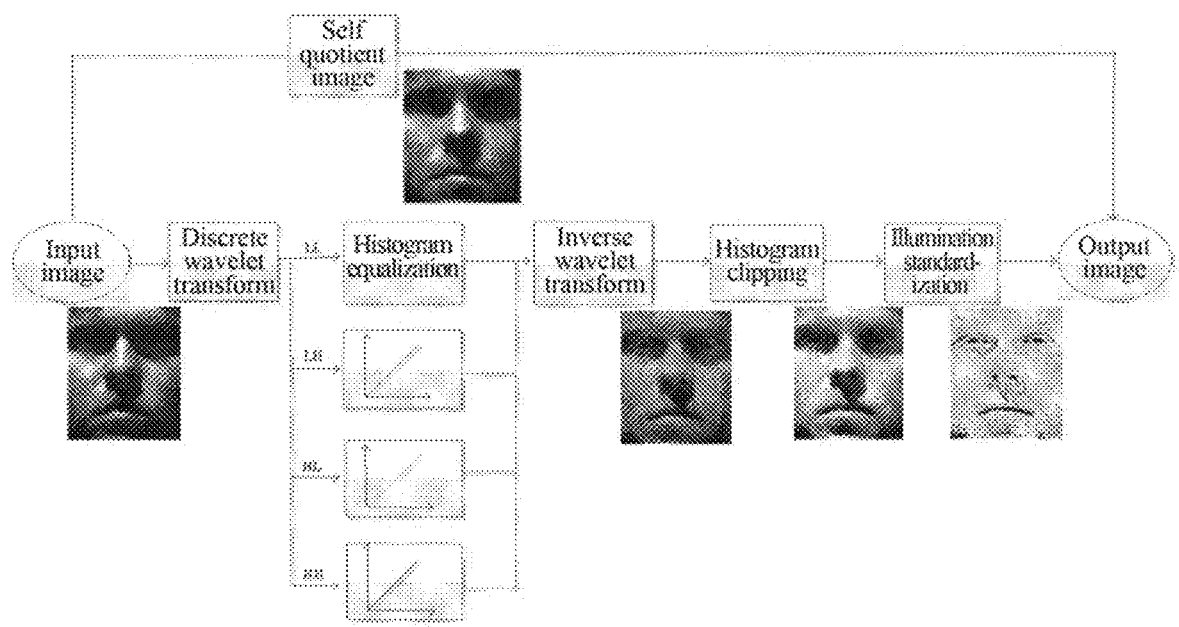
FIG. 2 is a detailed processing schematic diagram of the face recognition method in the first embodiment of the present disclosure.

The face recognition method in the embodiment of the present disclosure will be described below in detail with reference to FIG. 2. As shown in FIG. 2, the face recognition under multiple illuminations specifically includes the following steps.

In step 1, an original face image is input, such as a face image 1.

In step 2, illumination estimation processing is performed on the original face image, for example, to obtain a face image 2.

In step 3, wavelet transform processing, histogram equalization processing and inverse wavelet transform processing are performed on the original face image to obtain a synthesis face image, such as a face image 3.

In step 4, histogram clipping processing is performed on the synthesis face image to obtain a face image in which relatively light and dark portions in the synthesis face image are removed, such as a face image 4.

In step 5, a logarithmic operation is performed on each pixel in the face image obtained after the processing in the step 2, a logarithmic operation is performed on each pixel in the face image obtained after the processing in the step 4, and a former operation result is divided by a later operation result to obtain a final image of the face recognition, such as a face image 5.

In this embodiment, the illumination estimation processing is performed on the original face image to obtain the illumination component containing a sharpened edge.

Specifically, an image illumination estimation algorithm adopted by a self quotient image may be used, and band weighted processing is performed on a Gaussian filter and is represented by F, F=WG, where the W is a weight and the G is a Gaussian kernel. The illumination component is represented by a smooth low-frequency band of the face image and may be obtained by using a product of the weighted Gaussian kernel and the original image. It is assumed that $\Omega$ is a convolution area divided into $M_1$ and $M_2$ portions, the $M_1$ contains more pixels than the $M_2$, both the $M_1$ and the $M_2$ are associated with a threshold value $\tau$ and τ=Mean($I_Ω$). Where the I represents the original image. For the above two sub-areas, the W has the following values.

$$W(u, v) = \begin{cases} 0 & I(u, v) \in M_2 \\ 1 & I(u, v) \in M_1 \end{cases}$$

In this way, an illumination estimation image containing an enhanced edge is obtained.

In this embodiment, pre-processing operations, such as the wavelet transform and the histogram clipping and the like, are performed on the original face image to obtain a face pre-processing result with detail enhancement and edge sharpening, which is synchronous to the illumination estimation containing the sharpened edge in the illumination estimation processing.

Specifically, pre-processing is performed on the original face image, that is, the operations such as the wavelet transform, the histogram equalization, the inverse wavelet transform and the histogram clipping are performed in sequence. Through this pre-processing step, a face image which is more prominent in details, sharpened in the edge and uniformly distributed in illumination may be obtained, and then is taken as an original image for a formula of a Retinex theory (a retina and cerebral cortex theory). An illumination estimation manner in a self quotient image algorithm is adopted in the illumination component estimation, so that an obtained illumination image has a sharpened edge; and at last, an illumination standardization operation is performed to obtain a reflection component with enhanced details and no sharpened edge, and this reflection component is used for the face recognition. In respect of face image pre-processing, the previous multi-illumination face recognition technology based on the Retinex theory often takes an original image as an input image of the Retinex theory directly, and only focuses on how to obtain the illumination component.

In the embodiment of the present disclosure, not only is the illumination component focused, but also the pre-processing is performed on the original face image to obtain a face image processing result with enhanced details and reinforced edge information. In such a manner, when the Retinex theory is used, a reflection component which has a prominent detail and a smooth edge and better reflects intrinsic reflection characteristics of the face is obtained. In view of this, firstly a discrete wavelet is used to analyze the enhanced details and the edge information and the histogram equalization is performed on a low-frequency component; then, the inverse wavelet transform processing is performed. Since singular point pixels are present in the image, the histogram clipping operation is further added to remove maximum and minimum pixel points.

The image quotient calculation processing based on the Retinex theory will be described below.

According to the Retinex theory, it is considered that a face image is composed of an illumination component and a reflection component, and is a product of the illumination component and the reflection component. A quotient calculation operation may performed in a logarithmic domain by using a face pre-processing result and an estimated illumination component, to obtain a face reflection component that reflects intrinsic characteristics of the face and has edge elimination and detail enhancement. The face reflection component is used for the face recognition.

Figure 3:
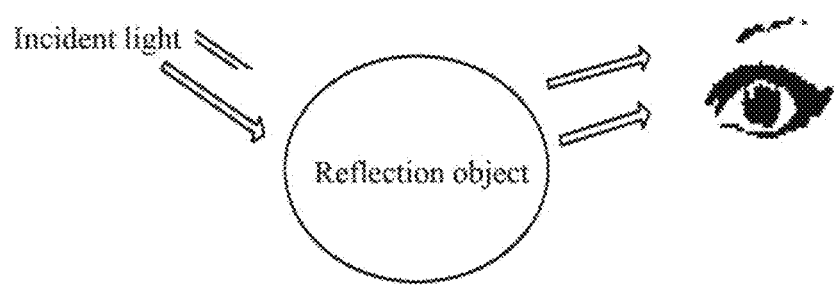
FIG. 3 is a schematic diagram of a Retinex theory in the first embodiment of the present disclosure.

FIG. 3 is a schematic diagram of a Retinex theory. The Retinex theory is also referred to as the retina and cerebral cortex theory. According to the theory, it is considered that the face image in reality is obtained by the product of the reflection component and the illumination component. The illumination component is a product of a light source onto an object, and reflects a low-frequency band portion of a real image. The reflection component is a product of reflection of the illumination passing by a surface of an object, and reflects a high-frequency portion of the real face image, namely details such as eyes and a mouth of the face. Moreover, the reflection component is independent of the illumination.

Figure 4:
FIG. 4 is a schematic diagram of face images of a same person with a same posture under different illuminations in the first embodiment of the present disclosure.

FIG. 4 illustrates face images of a same person with a same posture under different illuminations. A face database (YaleB) only including illuminations is used as a basis for processing, and 64 illumination change images of each person are divided into five subsets according to different angles between a light source and an optical axis of a camera, in which the five subsets represent the strength of the illumination changes. The subset 1 is taken as a training set and the rest image subsets are used for testing. Specifically, after pre-processing the original image and estimating the illumination component, a division operation in the logarithmic domain of a face pre-processing result and an estimated illumination component may be performed based on the Retinex theory to obtain a final reflection component reflecting the intrinsic characteristics of the face. The reasons for the processing in the logarithmic domain are that the division operation may be converted into a subtraction operation in the logarithmic domain and the logarithmic domain is more suitable for the perception of eyes to the illumination. Corresponding reflection image for each image of same face under different illuminations is obtained. The image subset 1 is taken as the training set and the rest image subsets are used as test sets. A Principal Component Analysis (PCA) recognition algorithm is employed and an inter-image Euclidean distance is used as a standard for judging the similarity.

Figure 5:
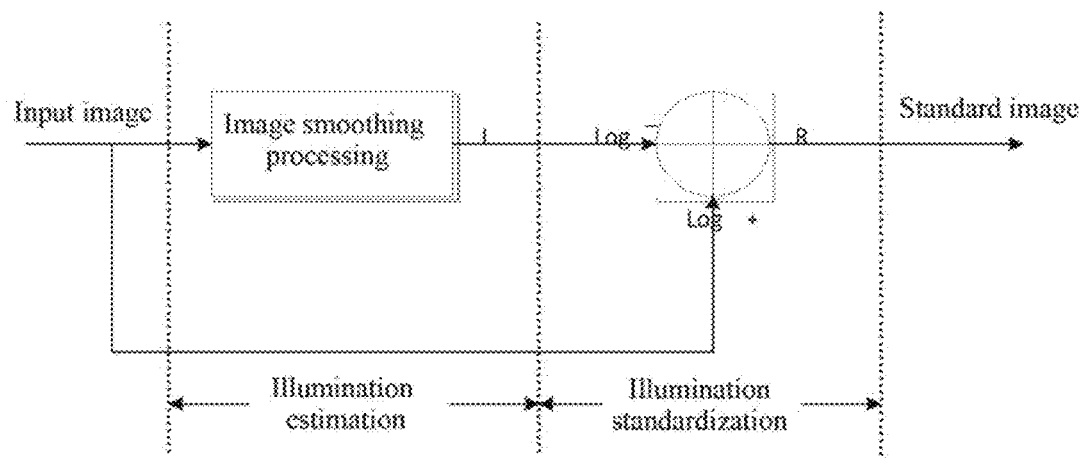
FIG. 5 is an overall framework diagram of the Retinex theory in the first embodiment of the present disclosure.

FIG. 5 is an overall framework diagram of the Retinex theory. The overall framework diagram includes an illumination estimation portion and an illumination standardization portion. The illumination estimation is to separate the illumination component from the real face image, the illumination component is represented by a smooth image and may be obtained, for example, by a Gaussian filter. After the illumination component is obtained, the quotient calculation operation (namely, the illumination standardization operation) is performed in a logarithmic domain on the original image and the illumination estimation image.

Figure 6:
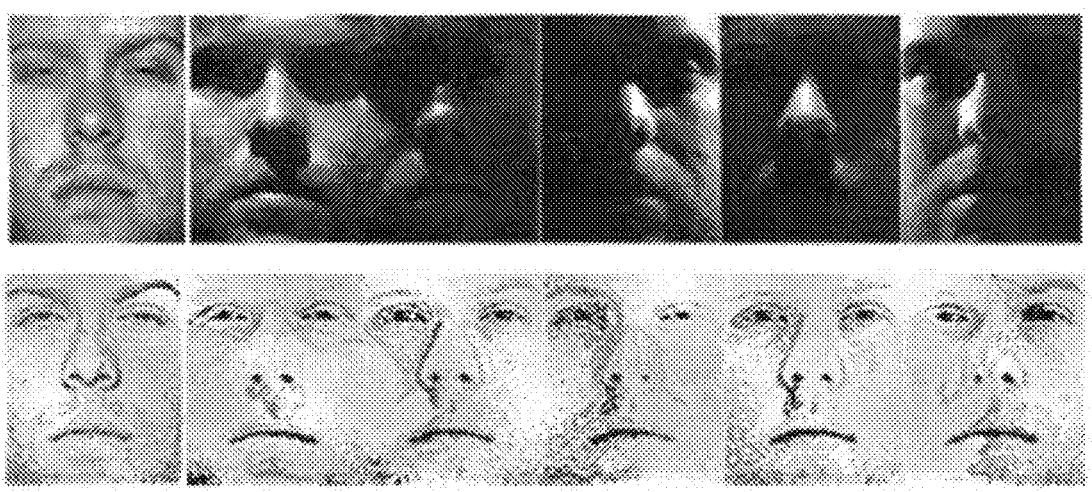
FIG. 6 is an effect diagram of processing face images through the face recognition method in the first embodiment of the present disclosure.

FIG. 6 is an effect diagram for processing face images under multiple illuminations provided by this embodiment of the present disclosure. FIG. 6 includes original images and processed images. In FIG. 6 the upper line is the original images and the lower line is the face images recognized by using the face recognition method provided by the embodiment of the present disclosure.

Second Embodiment

Figure 7:
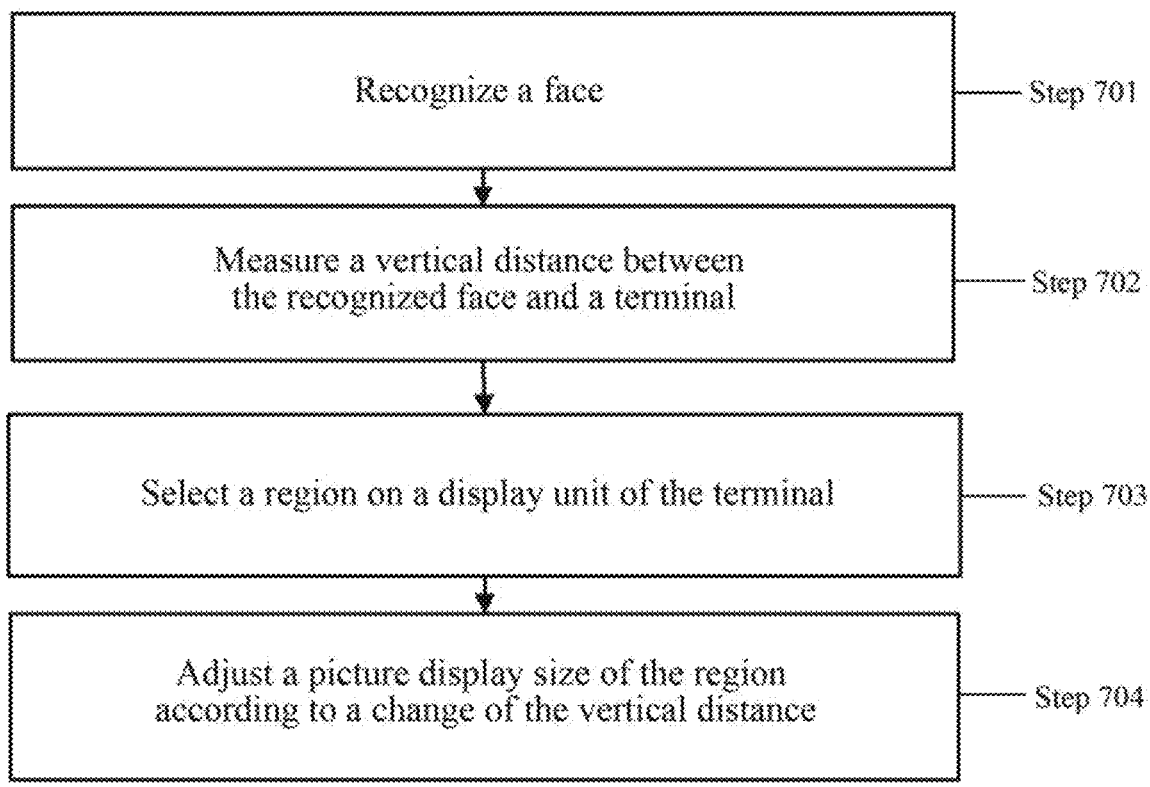
FIG. 7 is a flowchart of a picture display method in a second embodiment of the present disclosure.

An embodiment of the present disclosure provides a picture display method. FIG. 7 is a flowchart of the picture display method in the embodiment of the present disclosure. As shown in FIG. 7, the picture display method according to the embodiment of the present disclosure includes the following steps.

In step 701, a face is recognized.

The face may be recognized by using the face recognition method provided by the above-mentioned embodiments.

In step 702, an adjustment is made on a displayed picture according to the recognized face.

Herein, the step that an adjustment is made on a displayed picture according to the recognized face includes the following steps 7021-7023.

In step 7021, a vertical distance between the recognized face and a terminal is measured.

In step 7022, a region is selected on a display unit of the terminal.

In step 7023, a picture display size of the region is adjusted according to a change of the vertical distance.

Specifically, the picture display size of the region may be adjusted by using the following formula: L1=A+B1*C1. Where the L1 is a size of a frame line, displayed on the terminal, for the face when a distance between the face and the terminal changes; the A1 is a maximum face frame line, displayed on the terminal, for the face, and at this moment, the distance between the face and the terminal is the nearest; the B1 is a fixed value, and characterizes an amplification factor of the frame line when the face is at N1 times far from a screen, and the value range of the B1 is (−1, 0) and the value range of the N1 is (0, 1); and the C1 characterizes a value about Dots Per Inch, dpi, of the terminal with a movement of the face, and the value range of the C1 is (1, 5).

In an exemplary embodiment, the picture display method further includes the following step 703.

In step 703, a parallel moving distance of the region is determined according to an included angle between a frontal direction of the recognized face and a vertical direction of the terminal.

Specifically, the parallel moving distance of the region may be determined by using the following formula: L2=A2+B2*C2. Where the L2 is a horizontal position, on the terminal, of the face; the A2 is a position, in the middle of the terminal, of the face, at this moment, distances from left and right side frames to a midline are equal, and an included angle between a direction of the face and the vertical direction of the terminal is 0°; the B2 is a fixed value and characterizes a quantity by which the face image on the terminal moves leftward or rightward when an actual face angle is rotated by N2°, the value range of the B2 is (−1, 1) and the value range of the N2 is [−90, 90]; and the C2 characterizes a value about Dots Per Inch, dpi, of the terminal with a movement of the face, and the value range of the C2 is (1, 3).

In embodiments of the present disclosure, through the face recognition method under the multiple illuminations, a camera of a mobile phone is turned on to recognize the face in real time; a user intercepts any interested content on a pressure-sensitive screen by using a finger; the camera judges a distance between the face and the mobile phone screen to appropriately amplify the intercepted content to a screen center, and adjusts the amplification in real time according to a change of the distance; and when the face is relatively far from the mobile phone screen, movement orientation and movement quantity of the face are detected to parallelly move the amplified region. The face is recognized in real time by using the face recognition method under the multiple illuminations, and the amplification of the content intercepted and interested by the user is adjusted by judging the distance between the face and the center of the mobile phone screen; thereby, particularly under dark illumination, the user obtains better watching experience.

The main implementation process of the embodiments of the present disclosure includes face recognition under multiple illuminations, the interested content is intercepted on the pressure-sensitive screen, and the camera judges the distance between the face and the mobile phone screen in real time to adjust the amplification in real time, and when the distance is relatively far, the amplified region is parallelly moved according to the movement orientation and movement quantity of the face.

In the step 7022, the interested content may be intercepted through the pressure-sensitive screen. For a pressure-sensitive mobile phone screen, when the user reads on the mobile phone (for example, reads comics on the mobile phone), a viewing mode may be enabled, the finger is used to approximately select a region including an interested content, which may be a rectangular or any irregular pattern. After the mobile phone screen senses start and end positions of the finger, the background intercepts and amplifies this region.

In the step 7023, the distance between the face and the mobile phone screen is judged by the camera in real time to adjust the amplification in real time. How to process the intercepted content and amplify intercepted content to a most appropriate position is performed according to the distance between the face and the mobile phone screen. Once the camera of the mobile phone detects the face, the face image is displayed with a frame line on the mobile phone screen. The further the distance between the face and the screen, the smaller the rectangular region framed on the mobile phone screen, and the more the region intercepted is amplified. On the contrary, the nearer the distance to the screen, the larger the rectangle framed and the less the region intercepted is amplified. In this way, the amplification of the intercepted content may be controlled in real time by detecting the distance between the face and the mobile phone screen in real time, and thus the user experience is improved.

When the distance between the face and the mobile phone screen is calculated, the distance between the current face and the mobile phone screen may be judged by judging the size of a frame line, displayed on the mobile phone screen, for the face detected via the camera. Taking a ZTE Axon mobile phone (5.5 inches) as an example, the width is 2304 in pixels, the height is 4096 in pixels and the horizontal and vertical resolutions both are 72 dpi. The camera detects the face and draws out the frame line. It is determined whether is a face by detecting two eyes and a mouth at the same time. If yes, the frame line is amplified at the periphery into a square so that a triangle, formed by the two eyes and the mouth, is located in a dead center. When it is detected that the face is 12 cm far from the camera, the frame line is the largest and is propped against two edges of the mobile phone (which is taken me as an example, the frame line is associated with the size of the face of each person and is not fixed). At this moment, a 72*72 full frame is occupied. The frame line, displayed on the mobile phone screen, for the face, and the face may be approximated vividly by an imaging principle. The distance of the full frame line may be taken as a focus length. The further the object distance (the distance between the face and the screen), the smaller the image distance (it may be considered as a proportion of the frame line occupying the mobile phone screen). When the object distance is within the focus length, the image distance is infinite (the frame line is infinitely large) and at this moment, no image is formed (the face cannot be framed on the mobile phone screen).

Convex lens imaging principle:

$$\frac{1}{u}+\frac{1}{v}=\frac{1}{f}$$

Where, the u is the object distance, the v is the image distance and the f is the focus length.

A lens of the camera is a convex lens and the camera is manufactured by utilizing the convex lens imaging principle. When the object distance is greater than two times of focus length (u>2f) and the distance between the camera and a photographed object becomes far, the lens is drawn back and a photographed image becomes small (beyond the two times of the focus length, when the u become larger, the v becomes smaller and the image becomes smaller). When the distance between the camera and the photographed object becomes near, the lens stretches forward and a photographed image becomes larger (beyond the two times of the focus length, when the u becomes smaller, the v becomes larger and the image becomes larger).

For reference values of the table 1 showing a relationship between the distance between the face and the mobile phone screen and the frame line of the face, when 1 cm is increased, the frame line changes 0.5 dpi (when the distance between the face and the mobile phone distance is smaller than 12 cm, there is no frame line), which is also applied to the proportion of an area of the intercepted region in the mobile phone screen.

TABLE 1

| Distance between the face and the mobile phone screen (unit: cm) | Frame line of the face on the screen (unit: dpi) |
| --- | --- |
| 12 | 72*72 |
| 13 | 71.5*71.5 |
| 14 | 71*71 |
| 15 | 69.5*69.5 |
| ... | ... |

In the step 703, when the distance is relatively far, the amplified region may be parallelly moved according to the movement orientation and movement quantity of the face. When the face is relatively far from the mobile phone screen, the frame line of the face framed on the screen is much smaller. At this moment, the picture is amplified to be relatively large but the size of the mobile phone screen is limited, so the amplified region cannot be displayed completely. If the distance between the face and the mobile phone screen is unchanged, the amplified region may be moved upward, downward, leftward and rightward by judging the movement orientation and movement quantity of the face via the face recognition algorithm. When the face is moved rightward, the amplified region is moved leftward; and conversely, the amplified region is moved rightward. Because of split vision of the eyes, the content on the mobile phone screen may also be completely seen, and the user experience is better.

A relationship between the movement orientation and the movement quantity of the face and the parallel movement of the intercepted region will be described below. Because of the split vision of the eyes, a portion not quietly opposite to the face may be seen clearly. Hence, when the face of a person has a relatively large movement, the amplified region is correspondingly moved (when the face is moved rightward, the amplified region is parallelly moved leftward; and conversely, the amplified region is parallelly moved rightward). Here the reference values are given, taking an Axon mobile phone as an example, the amplified region is correspondingly moved by 1 cm when the face is moved for 20°, and for this way, the amplified region is moved linearly (when the face is rotated to 90°, the amplified region is no longer moved), which may be referred to the table 2 (in which an example that the distance between the face and the mobile phone screen is unchanged and the face is moved rightward is provided):

TABLE 2

| Angle that the face is moved rightward (unit: °) | the quantity by which the amplified region is moved leftward (unit: cm) |
| --- | --- |
| 20 | 1 |
| 40 | 2 |
| 60 | 3 |
| 80 | 4 |

This embodiment of the present disclosure provides an automatic scaling of the intercepted screen content under multiple illuminations particularly under a dark illumination condition, and thus the user obtains the best watching experience. The camera first recognizes the face; after the user intercepts the interested content on the screen, the camera judges the distance between the face and the mobile phone screen at this moment according to the size of the frame line, displayed on the mobile phone screen, for the face, and a background program adjusts the amplification according to this distance. If the distance between the face and the screen is relatively far, the content intercepted by the user may further be parallelly moved according to steering of a head.

Third Embodiment

Figure 8:
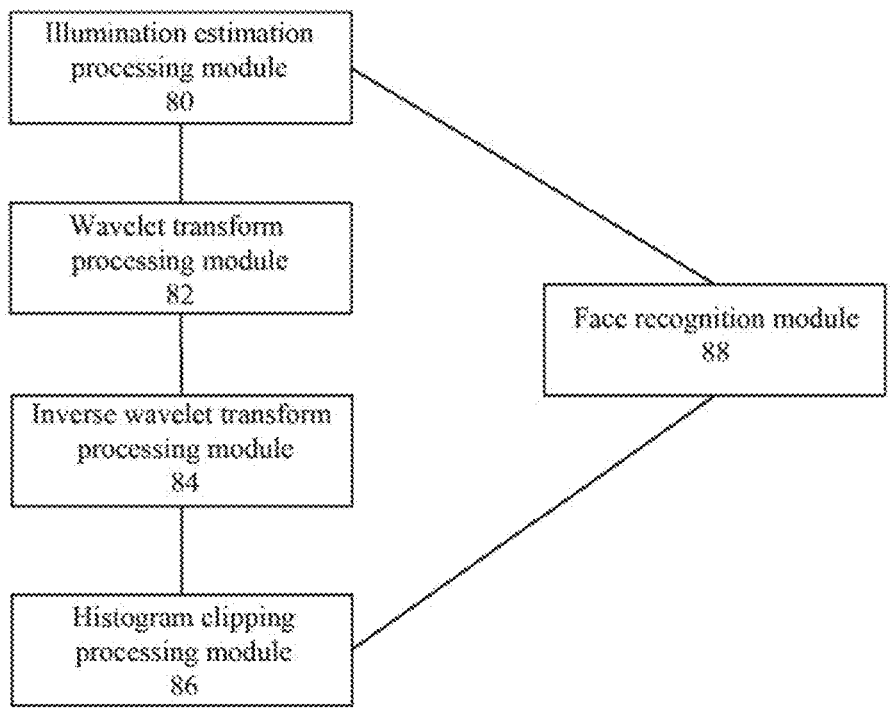
FIG. 8 is a structural schematic diagram of a face recognition device in a third embodiment of the present disclosure.

An embodiment of the present disclosure provides a face recognition device. FIG. 8 is a structural schematic diagram of the face recognition device in the embodiment of the present disclosure. As shown in FIG. 8, the face recognition device in the embodiment of the present disclosure includes: an illumination estimation processing module 80, a wavelet transform processing module 82, an inverse wavelet transform processing module 84, a histogram clipping processing module 86 and a face recognition module 88. Each of the modules in the embodiment of the present disclosure will be described below in detail.

The illumination estimation processing module 80 is configured to perform illumination estimation processing on an original face image to obtain a first face image.

The wavelet transform processing module 82 is configured to perform wavelet transform processing on the original face image to obtain a face image component.

The inverse wavelet transform processing module 84 is configured to perform inverse wavelet transform processing on the face image component to obtain a second face image.

The histogram clipping processing module 86 is configured to perform histogram clipping processing on the second face image to obtain a third face image.

The face recognition module 88 is configured to recognize a face according to the first face image and the third face image.

Fourth Embodiment

Figure 9:
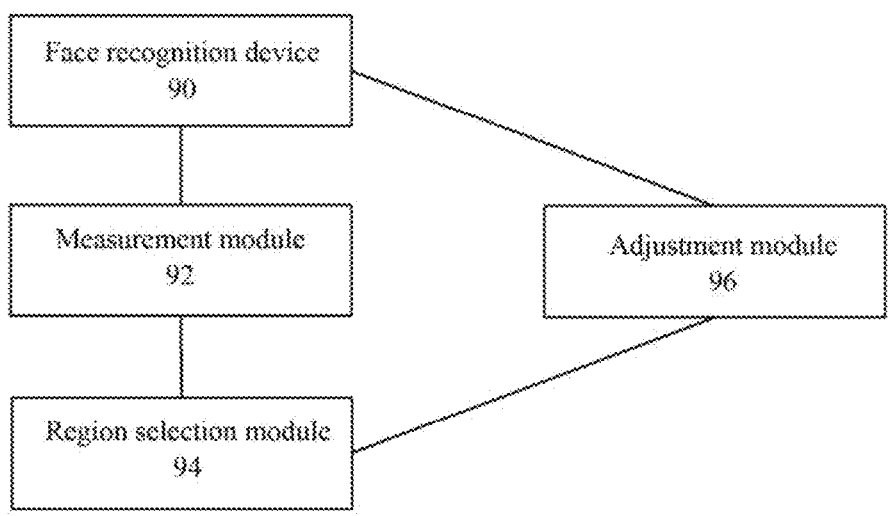
FIG. 9 is a structural schematic diagram of a picture display device in the fourth embodiment of the present disclosure.

An embodiment of the present disclosure provides a picture display device. FIG. 9 is a structural schematic diagram of the picture display device in the embodiment of the present disclosure. As shown in FIG. 9, the picture display device in the embodiment of the present disclosure includes a face recognition device 90, a measurement module 92, a region selection module 94 and an adjustment module 96. Each of the modules in the embodiment of the present disclosure will be described below in detail.

The face recognition device 90 is the face recognition device in the third embodiment.

The measurement module 92 is configured to measure a vertical distance between the recognized face and a terminal.

The region selection module 94 is configured to select a region on a display unit of the terminal.

The adjustment module 96 is configured to adjust a picture display size of the region according to a change of the vertical distance.

In an exemplary embodiment, the device further includes a parallel moving module, configured to determine a parallel moving distance of the region according to an included angle between a frontal direction of the recognized face and a vertical direction of the terminal, and perform parallel movement on the region according to the parallel moving distance of the region.

An embodiment of the present disclosure further provides a computer readable storage medium; the computer readable storage medium stores a computer executable instruction; and the computer executable instruction, when being executed, implements the face recognition method.

An embodiment of the present disclosure further provides a computer readable storage medium; the computer readable storage medium stores a computer executable instruction; and the computer executable instruction, when being executed, implements the picture display method.

According to the embodiments of the present disclosure, when people read the interested content on the mobile phone (for example, reading comics on the mobile phone), under a condition in which the light is very bad, people often open the eyes wide and thus hope to see more clear, which is very inconvenient. The embodiments of the present disclosure provide the face recognition method under the multiple illuminations. In the method the content intercepted by the user is scaled, and the amplification is automatically adjusted by using the distance between the face and the screen, and the camera detects the movement orientation and movement quantity of the face to parallelly move the amplified region. In this way, under the condition in which the light is very bad, very good user experience can also be obtained.

It is apparent that those skilled in the art may make various modifications and variations of the present application without departing from the rule and scope of the present application. If these modifications and variations of the present application pertain to the scope of the claims and equivalent technologies of the present application, the present application is also intended to include these modifications and variations.

The algorithm and display provided here are inherently irrelevant to any special computer, virtual system or other devices. A universal system may also be used together based on the teaching here. According to the above description, the structure required to construct such a system is obvious. In addition, the present application does not aim at any special programming language. It should be understood that the content of the present application described here may be implemented by using multiple programming languages and the above description on the special language is to disclose the alternative embodiments of the present application.

In the specification provided herein, numerous specific details are set forth. However, it can be understood that embodiments of the present disclosure may be practiced without these specific details. In some instances, well-known methods, structures and techniques have not been shown in detail in order not to obscure an understanding of this description.

Similarly, it should be appreciated that in the description of exemplary embodiments of the application, features of the application are sometimes grouped together in a single embodiment, figure, or description thereof for the purpose of simplifying the present disclosure and helping the understanding of one or more of the various inventive aspects. The methods of the present application, however, are not to be interpreted as reflecting an intention: the claimed application claims more features than those are expressly recorded in each claim. Thus, the claims following the detailed implementation manners are hereby expressly incorporated into this detailed implementation manner. Herein, each claim can be as a separate embodiment of the application.

Those skilled in the art may understand that, modules in a client in an embodiment may be adaptively changed and are arranged in one or more clients different from that of the embodiment. The modules in the embodiment may be combined into one module, and may also be split into multiple sub-modules or sub-units or sub-components. Except some of such features and/or processes or units which are mutually exclusive, all features disclosed in the specification (including any accompanying claims, abstract and drawings) and all processes or units of any method or client disclosed thereto may be combined in any combination. Each feature disclosed in this specification (including any accompanying claims, abstract and drawings) may be replaced by alternative features for the same, equivalent or similar purpose, unless expressly stated otherwise.

In addition, although some embodiments described herein include some rather than other features included in other embodiments, combinations of features of different embodiments are meant to be within the scope of the application, and form different embodiments, as would be understood by those skilled in the art. For example, in the following claims, any of the claimed embodiments can be used in any combination.

Each component embodiment in the present application may be implemented via hardware, or is implemented by a software module running on one or more processors, or is implemented via any combination of hardware and software. Those skilled in the art should understand that some or all functions of some or all components in the client loaded in websites with a sequence according to the embodiment of the present disclosure may be implemented by using a microprocessor or a Digital Signal Processor (DSP) in practice. The present application may further be implemented as a device or a device program (such as a computer program and a computer program product) for executing some or all of the method described here. The program for implementing the present application may be stored on a computer storage medium, or may be provided with a form having one or more signals. These signals may be downloaded from an internet website, or are provided on a signal carrier, or are provided in any other form.

It should be noted that, the above embodiments are used to illustrate the present application but are not intended to limit the present application. Those skilled in the art may design alternative embodiments without departing from the scope of the appended claims. In the claims, any reference symbol between brackets should not be constructed as a limitation to the claims. The term "comprise" or "include" does not exclude an element or a step not listed in the claims. Terms "a" or "an" before an element do not exclude that there are multiple such elements. The present application may be implemented by virtue of hardware including a plurality of different elements and by virtue of an appropriate programming computer. In element claims in which pluralities of devices are listed, the pluralities of devices may be specifically embodied by the same hardware. The terms such as first, second and third do not indicate any sequence and may be explained as nouns.

INDUSTRIAL APPLICABILITY

According to the above technical solutions, the operation amount of the user can be reduced, the intelligent degree of the mobile phone can be improved, the convenience and the practicability for the user to use the mobile phone can be enhanced, and the user experience can be improved.

What is claimed is:

1. A face recognition method, comprising:
performing illumination estimation processing on an original face image to obtain a first face image;
performing wavelet transform processing on the original face image to obtain a face image component;
performing inverse wavelet transform processing on the face image component to obtain a second face image;
performing histogram clipping processing on the second face image to obtain a third face image; and
recognizing a face according to the first face image and the third face image.

2. The method according to claim 1, wherein the step of performing wavelet transform processing on the original face image to obtain a face image component comprises:
performing two-order wavelet transform processing on the original face image to obtain an illumination component, a face detail horizontal component, a face detail vertical component and a face detail diagonal component.

3. The method according to claim 2, wherein the step of performing inverse wavelet transform processing on the face image component to obtain a second face image comprises:
performing equalization processing on the illumination component;
performing linear addition processing on the face detail horizontal component;
performing linear addition processing on the face detail vertical component;
performing linear addition processing on the face detail diagonal component; and
performing the inverse wavelet transform processing on the illumination component after the equalization processing, the face detail horizontal component after the linear addition processing, the face detail vertical component after the linear addition processing and the face detail diagonal component after the linear addition processing, to obtain the second face image.

4. The method according to claim 1, wherein the step of recognizing a face according to the first face image and the third face image comprises:
performing a logarithmic operation on a pixel value of the first face image to obtain a first pixel value;
performing a logarithmic operation on a pixel value of the third face image to obtain a second pixel value;
taking a ratio, obtained through the first pixel value divided by the second pixel value, as a face image; and
recognizing the face according to the face image.

5. A picture display method, comprising:
making an adjustment on a displayed picture according to the recognized face that is recognized according to the face recognition method of claim 1, wherein the making an adjustment on a displayed picture according to the recognized face comprises:
measuring a vertical distance between the recognized face and a terminal;
selecting a region on a display unit of the terminal; and
adjusting a picture display size of the region according to a change of the vertical distance.

6. The method according to claim 5, further comprising:
determining a parallel moving distance of the region according to an included angle between a frontal direction of the recognized face and a vertical direction of the terminal; and
performing parallel movement on the region according to the parallel moving distance of the region.

7. The method according to claim 5, wherein the adjusting a picture display size of the region comprises:
adjusting the picture display size of the region by using the following formula:

$$L1=A1+B1*C1,$$

where the L1 is a size of a frame line, displayed on the terminal, for the face when a distance between the face and the terminal changes; the A1 is a maximum face frame line, displayed on the terminal, for the face; the B1 is a fixed value and characterizes an amplification factor of the frame line when the face is at N1 times far from a screen, and the value range of the B1 is (−1, 0) and the value range of the N1 is (0, 1); and the C1 characterizes a value about Dots Per Inch, dpi, of the terminal with a movement of the face, and the value range of the C1 is (1, 5).

8. The method according to claim 6, wherein the determining a parallel moving distance of the region comprises:
determining the parallel moving distance of the region by using the following formula:

$$L2=A2+B2*C2,$$

where the L2 is a horizontal position, on the terminal, of the face; the A2 is a position, in the middle of the terminal, of the face, and at the moment an included angle between a direction of the face and the vertical direction of the terminal is 0°; the B2 is a fixed value and characterizes a quantity by which the face image on the terminal moves leftward or rightward when an actual face angle is rotated by N2°, the value range of the B2 is (−1, 1) and the value range of the N2 is [−90, 90]; and the C2 characterizes a value about Dots Per Inch, dpi, of the terminal with a movement of the face, and the value range of the C2 is (1, 3).

9. A non-transitory computer readable storage medium, storing a computer executable instruction, which, when being executed, implements the face recognition method according to claim 1.

10. A non-transitory computer readable storage medium, storing a computer executable instruction, which, when being executed, implements the picture display method according to claim 5.

11. A face recognition device, comprising:
an illumination estimation processing module, configured to perform illumination estimation processing on an original face image to obtain a first face image;
a wavelet transform processing module, configured to perform wavelet transform processing on the original face image to obtain a face image component;
an inverse wavelet transform processing module, configured to perform inverse wavelet transform processing on the face image component to obtain a second face image;

a histogram clipping processing module, configured to perform histogram clipping processing on the second face image to obtain a third face image; and a face recognition module, configured to recognize a face according to the first face image and the third face image.

12. A picture display device, comprising the face recognition device according to claim 11, a measurement module, a region selection module and an adjustment module, wherein the measurement module is configured to measure a vertical distance between the recognized face and a terminal;

the region selection module is configured to select a region on a display unit of the terminal; and the adjustment module is configured to adjust a picture display size of the region according to a change of the vertical distance.

13. The device according to claim 12, further comprising:

a parallel moving module, configured to determine a parallel moving distance of the region according to an included angle between a frontal direction of the recognized face and a vertical direction of the terminal, and perform parallel movement on the region according to the parallel moving distance of the region.

* * * * *